(12) United States Patent
Schwab et al.

(10) Patent No.: US 9,259,712 B2
(45) Date of Patent: *Feb. 16, 2016

(54) PROCESS FOR PRODUCING A REFORMING CATALYST AND THE REFORMING OF METHANE

(71) Applicant: BASF SE, Ludwigshafen (DE)

(72) Inventors: Ekkehard Schwab, Neustadt (DE); Andrian Milanov, Manheim (DE); Stephan Schunk, Heidelberg (DE); Thomas Roussiere, Manheim (DE); Guido Wasserschaff, Neckargemuend (DE); Andreas Strasser, Neckarsteinach (DE)

(73) Assignee: BASF SE, Ludwigshafen (DE)

( * ) Notice: Subject to any disclaimer, the term of this patent is extended or adjusted under 35 U.S.C. 154(b) by 261 days.

This patent is subject to a terminal disclaimer.

(21) Appl. No.: 13/671,159

(22) Filed: Nov. 7, 2012

(65) Prior Publication Data
US 2013/0116116 A1 May 9, 2013

Related U.S. Application Data

(60) Provisional application No. 61/556,846, filed on Nov. 8, 2011.

(51) Int. Cl.
| | |
|---|---|
| *B01J 23/755* | (2006.01) |
| *B01J 21/10* | (2006.01) |
| *C01B 3/26* | (2006.01) |
| *B01J 23/75* | (2006.01) |
| *B01J 23/00* | (2006.01) |
| *C01B 3/40* | (2006.01) |
| *B01J 37/08* | (2006.01) |
| *B01J 23/78* | (2006.01) |
| *B01J 35/00* | (2006.01) |
| *B01J 35/02* | (2006.01) |
| *B01J 35/10* | (2006.01) |
| *B01J 37/00* | (2006.01) |
| *B01J 37/02* | (2006.01) |

(52) U.S. Cl.
CPC ............... *B01J 23/005* (2013.01); *B01J 23/78* (2013.01); *B01J 35/002* (2013.01); *B01J 35/006* (2013.01); *B01J 35/0013* (2013.01); *B01J 35/0026* (2013.01); *B01J 35/023* (2013.01); *B01J 35/109* (2013.01); *B01J 35/1014* (2013.01); *B01J 35/1019* (2013.01); *B01J 35/1061* (2013.01); *B01J 35/1066* (2013.01); *B01J 35/1071* (2013.01); *B01J 35/1095* (2013.01); *B01J 37/0009* (2013.01); *B01J 37/0201* (2013.01); *C01B 3/40* (2013.01); *C01B 2203/0233* (2013.01); *C01B 2203/0238* (2013.01); *C01B 2203/1058* (2013.01)

(58) Field of Classification Search
None
See application file for complete search history.

(56) References Cited

U.S. PATENT DOCUMENTS

| | | | |
|---|---|---|---|
| 3,436,358 A | 4/1969 | Thygesen | |
| 3,451,949 A | 6/1969 | Frederik et al. | |
| 3,791,993 A * | 2/1974 | Rostrup-Neilsen | ........... 502/328 |
| 3,926,583 A | 12/1975 | Rostrup-Nielsen | |
| 5,939,353 A * | 8/1999 | Bhattacharyya et al. | ..... 502/327 |
| 6,242,380 B1 | 6/2001 | Park et al. | |
| 8,916,491 B2 | 12/2014 | Querner et al. | |
| 2007/0287626 A1* | 12/2007 | Jones et al. | ..................... 502/73 |
| 2008/0318759 A1* | 12/2008 | Richet et al. | ................... 501/80 |
| 2009/0261020 A1 | 10/2009 | Moon et al. | |
| 2011/0038775 A1* | 2/2011 | Takahashi et al. | ......... 423/245.1 |
| 2011/0114892 A1 | 5/2011 | Jun et al. | |

FOREIGN PATENT DOCUMENTS

| | | |
|---|---|---|
| CN | 101391218 A | 3/2009 |
| DE | 195 03 522 A1 | 8/1996 |
| EP | 2 308 594 A2 | 4/2011 |

(Continued)

OTHER PUBLICATIONS

European Search Report Issued Apr. 12, 2012 in Patent Application No. 11188237.9 (with English translation of Categories of Cited Documents).

(Continued)

*Primary Examiner* — Melvin C Mayes
*Assistant Examiner* — Douglas Call
(74) *Attorney, Agent, or Firm* — Oblon, McClelland, Maier & Neustadt, L.L.P.

(57) ABSTRACT

The present invention relates to a process for producing a catalyst for the reforming of hydrocarbons, preferably methane, in the presence of $CO_2$, water and/or hydrogen. The production of the catalyst is based on contacting of a hydrotalcite-comprising starting material with a fusible metal salt. The compounds which have been brought into contact with one another are intimately mixed and treated thermally, resulting in the fusible metal salt forming a melt. After molding, the material is subjected to a high-temperature calcination step. The metal salt melt comprises at least one metal selected from the group consisting of K, La, Fe, Co, Ni, Cu and Ce, preferably Ni. The metal salt melt more preferably comprises nickel nitrate hexahydrate. In addition, the invention relates to the use of the catalyst of the invention for the reforming of hydrocarbons, preferably methane, in the presence of $CO_2$, water and/or hydrogen at elevated pressures which are greater than 5 bar, preferably greater than 10 bar, particularly preferably greater than 20 bar. The catalyst according to the invention is distinguished from the prior art by particular, preferred physicochemical properties.

20 Claims, 1 Drawing Sheet

(56) References Cited

FOREIGN PATENT DOCUMENTS

| GB | 1058757 | | 2/1967 |
|---|---|---|---|
| GB | 1 442 172 | | 7/1976 |
| KR | 10-0892033 B1 | | 4/2009 |
| WO | WO 2007/046591 A1 | | 4/2007 |
| WO | WO 2009/110241 | * | 9/2009 |

OTHER PUBLICATIONS

A. Djaidja et al., "Characterization and activity in dry reforming of methane on NiMg/Al and Ni/MgO catalysts", Catalysis Today, vol. 113, 2006, pp. 194-200.

Steven Corthals et al., "Development of dry reforming catalysts at elevated pressure: D-optimal vs. full factorial design", Catalysis Today, vol. 159, 2011, pp. 12-24.

Steven Corthals et al., "Design of active and stable $NiCeO_2ZrO_2MgAl_2O_4$ dry reforming catalysts", Applied Catalysis B: Environmental, vol. 105, 2011, pp. 263-275.

N. Laosiripojana et al., "Synthesis gas production from dry reforming of methane over $CeO_2$ doped $Ni/Al_2O_3$: Influence of the doping ceria on the resistance toward carbon formation", Chemical Engineering Journal, vol. 112, 2005, pp. 13-22.

Catherine Batiot-Dupeyrat et al., "$CO_2$ reforming of methane over $LaNiO_3$ as precursor material", Catalysis Today, vol. 107, No. 108, 2005, pp. 474-480.

C. Gennequin et al., "Use and observation of the hydrotalcite "memory effect" for VOC oxidation", Catalysis Today, vol. 157, 2010, pp. 191-197.

Carlos Enrique Daza et al., "High stability of Ce-promoted Ni/Mg—Al catalysts derived from hydrotalcites in dry reforming of methane", Fuel, vol. 89, 2010, pp. 592-603.

K.B. Mok et al., "Thermally and Mechanically Stable Catalysts for Steam reforming and Methanation. A new Concept in Catalyst Design.", Studies in surface science and catalysis, vol. 16, 1983, pp. 291-299.

Michael R. Gelsthorpe et al., "The Effect of Lanthanum Additives on the Catalytic Activities of $Ni$—$Al_2O_3$ Coprecipitated Catalysts for the Methanation of Carbon Monoxide", Journal of Molecular Catalysis, vol. 25, 1984, pp. 253-262.

H.G.J. Lansink Rotgerink et al., "Studies on the Promotion of Nickel—Alumina Coprecipitated Catalysts", Applied Catalysis, vol. 45, 1988, pp. 257-280.

Bernard C. Lippens et al., "The Preparation and Properties of Lanthanum-Promoted Nickel—Alumina Catalysts: Structure of the Precipitates", Solid State Ionics, vol. 16, 1985, pp. 275-282.

T. Borowiecki et al., "The influence of promoters on the coking rate of nickel catalysts in the steam reforming of hydrocarbons", Studies in Surface Science and Catalysis, vol. 119, 1998, pp. 711-716.

Supplementary European Search Report issued in corresponding European Patent Application No. EP 12 84 7506 dated Jul. 13, 2015.

* cited by examiner

PROCESS FOR PRODUCING A REFORMING CATALYST AND THE REFORMING OF METHANE

The invention relates to a process for producing a catalyst and the use of the catalyst of the invention for the reforming of hydrocarbons, preferably a feed gas having a high methane content, in the presence of high proportions of $CO_2$. To produce the catalyst, hydrotalcite-comprising starting material is brought into contact with a fusible metal salt, preferably a salt comprising nickel nitrate, intimately mixed and subjected to a.) a thermal treatment step and b.) a calcination step.

GB 1 058 757 discloses a catalytic process for reforming hydrocarbons for producing synthesis gas and catalysts suitable for this purpose. The production of the catalysts of the invention comprises firstly producing spinel compounds or spinel-comprising compounds which are loaded with an active metal in a subsequent step. In a preferred embodiment, the application of the active metal is effected by melt impregnation. It is disclosed that the spinels used can comprise a porous magnesium-aluminum spinel $MgAl_2O_4$ and the salt melt for the melt impregnation comprises nickel nitrate hexahydrate.

In GB 1 442 172, BASF discloses a cracking catalyst for producing a methane-comprising gas from C2-C30-hydrocarbons in the presence of steam. In the production of the catalyst, a precursor compound composed of nickel-comprising hydrotalcite is formed. The formation of the precursor compound is carried out, if desired, by simultaneous or successive precipitation of the hydroxides from salt solutions comprising nickel, magnesium and aluminum. Alkali-comprising species are removed by washing the hydroxide-comprising precipitate. The precipitated mixed metal hydroxide is subjected to drying and calcination. A temperature in the range from 80° C. to 180° C. is disclosed for drying and a temperature in the range from 350° C. to 550° C. is disclosed for calcination. Subsequent to the calcination, the catalyst is heated to from 300° C. to 500° C. and exposed to a reductive atmosphere in order to convert the major part of the nickel oxide into nickel metal. Hydrogen is used here as reducing agent.

In Catalysis Today (Volume 113, Issues 3-4, 15 Apr. 2006, pages 194-200), Djaidja et al. disclose that catalysts comprising nickel, magnesium and aluminum can be used successfully in dry reforming.

Jacobs et al. (Catalysis Today, Volume 159, Issue 1, 10 Jan. 2011, pages 12-24; Applied Catalysis B: Environmental Volume 105, Issues 3-4, 22 Jun. 2011, pages 263-275) report the development of nickel-comprising catalysts by high-throughput processes which can be promoted by a series of different elements. The catalysts for dry reforming were produced by precipitation methods known to those skilled in the art. Jacobs et al. report that rare earths such as lanthanum or cerium and zirconium are particularly good promoters for maintaining the catalytic activity.

Laosiripojana et al. likewise report the performance-increasing effect of cerium additions to catalysts comprising nickel, magnesium and aluminum (see Chemical Engineering Journal Volume 112, Issues 1-3, 1 Sep. 2005, pages 13-22).

Batiot-Dupeyrat et al. report that complex oxides of nickel with lanthanides can be used successfully for dry reforming (Catalysis Today Volumes 107-108, 30 Oct. 2005, pages 474-480). The findings of the work make it obvious that nickel is sweated out from the complex oxide with lanthanum under reaction conditions and then forms nanocrystallites of metallic nickel.

Gennequin et al. (Catalysis Today Article in Press, Corrected Proof—Note to usersdoi:10.1016/j.cattod.2011.01.029) were able to establish that hydrotalcite-like precursors of cobalt, magnesium and aluminum lead to materials which can be used as catalysts for dry reforming reactions.

Daza et al. (Fuel Volume 89, Issue 3, March 2010, pages 592-603) were likewise able to show that utilization of hydrotalcite-like precursors leads to materials which comprise nickel, magnesium, aluminum and cerium and can be used as catalysts in dry reforming.

U.S. Pat. No. 3,436,358 discloses a process for producing a catalyst comprising nickel, magnesium and aluminum for reforming reactions. In this process, a magnesium-comprising spinel is firstly produced by high-temperature treatment and this is then treated with molten nickel nitrate in order to obtain the catalyst comprising nickel, magnesium and aluminum.

U.S. Pat. No. 3,451,949 discloses that catalysts comprising nickel, magnesium and aluminum can be promoted by addition of alkali metals such as potassium.

EP 2 308 594 A2 discloses a nickel-comprising catalyst for producing synthesis gas from methane, water and carbon dioxide in a ratio in the range 1.0/1.0-2.0/0.3-0.6. The improved stability of the catalyst is achieved by addition of Ce and/or Zr. The experimental examples also disclose a synthesis using magnesium-aluminum hydrotalcite as starting material. An impregnation process in which hydrotalcite as support is impregnated with an aqueous nickel nitrate solution and the water is subsequently removed in a vacuum evaporator at 70° C. is disclosed. In the process disclosed in EP 2 308 594 A2 for producing a synthesis gas, the feed stream used has a minimum content of 1 mol of water per mole of methane and the process is carried out at a pressure in the range from 0.5 to 20 atm. EP 2 308 594 A2 discloses an example in which the catalytic tests for producing synthesis gas were carried out at 10 atm. Mok et al. (Studies in Surface Science and Catalysis Volume 16, 1983, pages 291-299) report that lanthanides such as lanthanum can successfully be used as promoters in reforming catalysts comprising nickel and aluminum. Apart from the advantageous effect of the lanthanide promoters in reforming reactions, catalysts which have been promoted in this way also have an advantageous effect in methanation. Likewise, Gelsthorpe et al. (Journal of Molecular Catalysis Volume 25, Issues 1-3, July 1984, pages 253-262), report that lanthanum and cerium can be used successfully in nickel-comprising methanation catalysts.

Further authors report similar findings in respect of the promoting effect of lanthanides: these authors include Lansink Rotgerink et al. (Applied Catalysis Volume 45, Issue 2, 1988, pages 257-280), Lippens et al. (Solid State Ionics Volume 16, June 1985, pages 275-282), Borowiecki et al. (Studies in Surface Science and Catalysis Volume 119, 1998, pages 711-716). Ruojun et al. disclose that this effect may well be attributable to a smaller nickel crystallite size in the presence of promoters such as lanthanides (Studies in Surface Science and Catalysis Volume 68, 1991, pages 243-247).

One of the objects of the invention is to provide an improved process and an improved catalyst for the reforming of hydrocarbons in the presence of $CO_2$. Here, the synthesis of the catalyst material should firstly be improved. In addition, the reforming process should be optimized when at the same time using the catalyst which has been improved compared to the prior art. Further objects are, inter alia, to provide a very environmentally friendly process for catalyst production and to develop a production process in which the catalyst having only small amounts of impurities can be obtained.

The objects mentioned here and other objects which are not mentioned here are achieved by a process for producing a catalyst for the reforming of hydrocarbons in the presence of water and $CO_2$ to give synthesis gas by impregnation of a starting material with a fusible metal salt, wherein the production process comprises the following steps:

(i) contacting of a fusible metal salt and finely divided hydrotalcite-comprising starting material,
(ii) intimate mixing of the fusible metal salt and the hydrotalcite-comprising starting material,
(iii) thermal treatment of the fusible metal salt and the hydrotalcite-comprising starting material and heating of the mixture under conditions under which the metal salt is present in the form of a metal salt melt, preferably at a temperature in the range from 30 to 250° C., more preferably at a temperature in the range from 50 to 140° C.,
(iv) low-temperature calcination of the mixture at a temperature of <500° C., preferably at a temperature in the range from 250 to 500° C., with the duration of the low-temperature calcination preferably being in the range from 0.1 to 24 hours,
(v) molding or shaping,
(vi) high-temperature calcination of the mixture at a temperature of ≥500° C., preferably at a temperature in the range from 500 to 1000° C., with the duration of the high-temperature calcination preferably being in the range from 0.1 to 24 hours.

In a preferred embodiment, the calcination in process steps (iv) and (vi) is carried out using a defined heating rate and/or cooling rate, with the heating rate and/or cooling rate preferably being in the range from 0.01 to 10° C. per minute, more preferably in the range from 0.1 to 5° C. per minute.

In a preferred embodiment of the process, the shaping step (v) is followed by a sieving step.

Further preference is given to the metal salt fraction comprising a nickel salt, preferably nickel nitrate hexahydrate.

The hydrotalcite-comprising starting material preferably has defined proportions of magnesium and aluminum, preferably at least 10 mol % of magnesium and at least 10 mol % of aluminum.

The invention also provides a catalyst for the reforming of hydrocarbon-comprising compounds and $CO_2$ to give synthesis gas, wherein this catalyst can be obtained by the following steps:

(i) contacting of a fusible metal salt and finely divided hydrotalcite-comprising starting material,
(ii) intimate mixing of the metal salt and the hydrotalcite-comprising starting material,
(iii) thermal treatment of the fusible metal salt and the hydrotalcite-comprising starting material and heating of the mixture under conditions under which the metal salt is present in the form of a melt, preferably at a temperature in the range from 30 to 250° C., more preferably at a temperature in the range from 50 to 140° C.,
(iv) low-temperature calcination of the mixture at a temperature of <500° C., preferably at a temperature in the range from 250 to 500° C., with the duration of the low-temperature calcination preferably being in the range from 0.1 to 24 hours,
(v) molding or shaping,
(vi) high-temperature calcination of the mixture obtained in the preceding steps at a temperature of ≥500° C., preferably at a temperature in the range from 500 to 1000° C., with the duration of the high-temperature calcination preferably being in the range from 0.1 to 24 hours.

In the catalyst of the invention, the nickel is present in very highly disperse form on the support oxide and the support oxide consists of or comprises very small particles of $MgAl_2O_4$. This results in catalysts having an improved property profile which is reflected both in an improved sintering stability at high temperatures and in an improved carbonization behavior.

The production process of the invention has advantages over production processes based on precipitation methods. The process of the invention forms no significant amount of process water or the process of the invention can also be carried out in such a way that absolutely no process water is formed. At the same time as avoiding the formation of process water, precipitation agents can also be saved. The problems associated with precipitation agents, namely introduction of contamination, can be prevented.

As regards the synthesis of the catalysts of the invention, it should be emphasized that an extremely energy-efficient and environmentally friendly process is provided because of the largely water-free production process.

Based on the total pore volume of the hydrotalcite-comprising support used, preferably hydrotalcite, the amount of water used is preferably ≤100%, more preferably ≤90%, even more preferably ≤70%, more preferably ≤50%, even more preferably ≤40%, particularly preferably ≤30% and more preferably ≤20%, of the total pore volume of the support. In a further preferred embodiment of the invention, the catalyst can be produced without addition of water since the water necessary for the synthesis is in this case supplied solely by the water of hydration of the salt.

In addition, a high metal loading or deposition of metal-containing phase on the support oxide or precipitation on a material which is a precursor of the support oxide can also be achieved by means of the process of the invention.

The process of the invention makes it possible to produce carbonization-stable active compositions. The active compositions are suitable for steam reforming of methane or gases having a high methane content at ratios of water to carbon (steam-to-carbon ratio) in the range from 10 to 3. The active compositions of the invention can be operated stably at, in particular, water-to-carbon ratios below 3, preferably below 2, very particularly preferably below 1.

The process of the invention makes it possible to produce carbonization-stable active compositions which also allow $CO_2$ imports in addition to classical applications such as steam reforming of methane or gases having a high methane content. The catalysts can, in particular, be operated stably at methane-to-carbon dioxide ratios equal to or less than 3, preferably equal to or less than 2, very particularly preferably equal to or less than 1. The catalysts can be operated stably at steam-to-carbon ratios below 3, preferably below 2, very particularly preferably below 1, where in the case of $CO_2$ import the carbon is calculated as the sum of methane and carbon dioxide.

Operation of the catalysts in steam reforming using carbon-comprising feeds, which in the case of conventional catalysts likewise lead to rapid carbonization, is likewise encompassed by the process of the invention. Such feeds can, for example, be: ethanol, in particular bioethanol, petroleum derivatives such as naphtha or diesel, oils originating from uses such as pyrolysis of biogenic or fossil carbon-comprising resources or offgases or oils from coking works.

The process of the invention makes it possible to produce synthesis gas having a high CO content, with the synthesis gas obtained by the process having an $H_2/CO$ ratio of less than 2.5 and in particular an $H_2/CO$ ratio of less than 1.5. The feed gases used for the process of the invention, comprise hydrocarbons, $CO_2$ and water. Preference is given to using hydrocarbon-comprising feed gases which comprise high proportions of $CH_4$ as hydrocarbon and $CO_2$, with particular preference being given to feed gases in which the sum of the proportions of methane and carbon dioxide is greater than 80% based on the total gas stream. Apart from $CO_2$ and hydrogen, the feed gas can likewise comprise components such as CO and $H_2$.

The manner of mixing and the resulting combination of the hydrotalcite-comprising starting materials with the metal salt melt as per the process of the invention is extremely effective as regards the application and introduction of active components into the framework structure.

Without wishing to restrict the present invention by theoretical considerations, the following explanation of the formation of the catalyst of the invention appears plausible to us on the basis of structural studies on the formation mechanism: the treatment according to the invention of the hydrotalcite-comprising starting material with the nickel-comprising nitrate melt at a temperature of less than or equal to 500° C. leads to nanostructuring of the material. Magnesium is leached from the preformed layer-like carbon-comprising precursor material. Together with the nickel, a nanocrystalline mixed crystal phase $Ni_xMg_{(1-x)}O$ having a periclase-bunsenite structure is formed from the hydrotalcite. In addition, an Mg spinel phase and aluminum oxide phases which are partly amorphous and are transformed into crystalline spinels in which the particles are nanocrystalline only at relatively high calcination temperatures are formed.

Catalysts which at temperatures up to 1000° C. have nickel crystallites which are smaller than 100 nm, preferably smaller than or equal to 70 nm and particularly preferably smaller than or equal to 40 nm, and have a high resistance to sintering and carbonization processes are obtained. The present nanostructure of the material is particularly advantageous in respect of the catalytic properties thereof. In particular, the material according to the invention has been found to be an advantageous catalyst compared to the prior art which is particularly suitable for the reforming of gas streams which have a high carbon dioxide content.

In a preferred embodiment of the invention, the catalyst support comprises a magnesium spinel which is in intimate contact with a mixed oxide phase of nickel and magnesium. In this catalyst or catalyst precursor according to the invention, both the nickel-comprising phase and the spinel-comprising phase have very small crystallite sizes. In the case of the spinel-comprising phase, the average crystallite size is <00 nm, preferable ≤70 nm, more preferably ≤40 nm.

In a further preferred embodiment of the invention, the phase composition of the catalyst of the invention is distinguished by the intensity of the diffraction reflection at 43.15°±0.15°2θ (2 theta) (d=2.09±0.01 Å) being less than or equal to the intensity of the diffraction reflection at 44.83±0.20°2θ (d=2.02±0.01 Å) with the intensity of the diffraction reflection at 43.15°±0.15°2θ (2 theta) (d=2.09±0.01 Å) more preferably being less than the intensity of the reflection at 44.83±0.20°2θ (d=2.02±0.01 Å) and the intensity ratio of the two diffraction reflections $I_{(43.15°)}/I_{(44.83°)}$ even more preferably being in the range from 0.3 to 1.0, preferably from 0.5 to 0.99, even more preferably from 0.6 to 0.97 and particularly preferably from 0.7 to 0.92.

An illustrative depiction of a diffraction pattern (5-80°2θ) of a catalyst according to the invention is shown in FIG. 2.

The presence of small amounts of Ni spinel phase and possibly also NiO in the catalyst material of the invention or the catalyst precursor material is not ruled out. However, if an Ni spinel phase is present in the precursor material of the invention, it can be assumed that this will be transformed at the high pressures and the high temperatures of the use according to the invention of the catalysts.

The process of the invention enables all active metals which are present as a metal salt melt in the temperature range from 30° C. to 250° C. and result in catalysts which display catalytic activity as reforming catalyst to be applied to hydrotalcite or to hydrotalcite-comprising starting material. In a preferred embodiment, promoters can be added to the metal salt melt and/or further support oxides, pore-forming agents or binders can be introduced into the synthesis system in addition to the hydrotalcite-comprising starting material.

To produce the catalyst of the invention, preference is given to using metal salts which do not decompose during melting or in the case of which the decomposition is greatly inhibited kinetically. Examples of such metal salts are, inter alia, nitrates, nitrites, halides, chlorates, bromates, iodates, sulfates, sulfites. Particular preference is given to nitrates, nitrites and salt melts comprising nitrates and nitrites. The addition of particular additives to the melts, for example urea, ethylene glycol, is encompassed.

The fusible metal salts can comprise, for example, Na, K, Ca, Mg, Sr, Ba, Al, La, Y, Mo, W, Nb, Zr, Ti, Fe, Co, Ni, Cu, a platinum metal and/or Ce as cationic species. Possible anionic species are, in particular, nitrogen-comprising anions such as nitrates and nitrites. However, other anions such as halogens, sulfates and sulfites and other inorganic and organic anions known to those skilled in the art can in principle be used. The metal salts preferably comprise at least one nickel-comprising or cobalt-comprising component, preferably nickel nitrate hydrate or cobalt nitrate hydrate, for example hexahydrate.

The term hydrotalcite-comprising starting material as used in the present disclosure means that the material used comprises at least one hydrotalcite-like compound as significant constituent and can optionally comprise oxidic additive and/or secondary constituents. The total proportion of the hydrotalcite-like compound and the oxidic additive is greater than 50% by weight, preferably greater than 70% by weight and particularly preferably greater than 90% by weight. In addition to hydrotalcite-like compounds and oxidic additives, the hydrotalcite-comprising starting material can also comprise secondary constituents which comprise, for example, metal salts and serve, for example, to adapt the metal concentration of trivalent to divalent metal salt. Such secondary metal salt constituents are present in amounts of less than or equal to 10% by weight, preferably less than or equal to 5% by weight.

Hydrotalcite-like compounds are mixed hydroxides of divalent and trivalent metals which are made up of polycations and have a layer structure. Hydrotalcite-like compounds are also referred to in the literature as anionic clays, layered double hydroxides (=LDHs), Feitknecht compounds or double layer structures. Divalent metals which can be used are, for example, metals from the group consisting of Mg, Zn, Cu, Ni, Co, Mn, Ca and Fe and trivalent metals which can be used are, for example, metals from the group consisting of Al, Fe, Co, Mn, La, Ce and Cr.

In a preferred embodiment, the hydrotalcite-like compound is hydrotalcite. The hydrotalcites used for the process of the invention preferably comprise magnesium as divalent metal and aluminum as trivalent metal. The metals of the hydrotalcites used preferably comprise predominantly magnesium and aluminum.

The oxidic additive can also be a mixture, preferably a mixture comprising aluminum-comprising compounds. Examples of such aluminum-comprising oxidic additives are, inter alia, gibbsite, boehmite and pseudoboehmite. Typical contents of such aluminum oxides, hydroxides or oxide hydrates can be in the range from 30 to 95 percent by weight calculated on the basis of aluminum oxide (i.e. $Al_2O_3$). This corresponds to a molar proportion of aluminum based on total metal of from 26 to 84 mol %. Particular preference is given to the range from 50 to 80 percent by weight calculated on the basis of aluminum oxide. This corresponds to a molar proportion of aluminum based on total metal of from 44 to 70 mol %. Very particular preference is given to the range from 60 to 75 percent by weight calculated on the basis of aluminum oxide. This corresponds to a molar proportion of aluminum based on total metal of from 53 to 66 mol %.

The hydrotalcite-like compounds and the oxidic additive also display very intimate mixing.

Such mixing can be effected, for example, by physical mixing of hydrotalcite-like and aluminum hydroxide-comprising powders. For example, powder mixing can be carried out in suitable industrial apparatuses such as mixers. Such mixing processes are known to those skilled in the art. A further possibility is to mix the hydrotalcite-like powder and the aluminum hydroxide-comprising powder in suitable dispersion media. As dispersion media, it is possible to use, for example, water, alcohols such as methanol, ethanol, propanol, butanol, ethylene glycol and/or butanediol and ketones such as acetone or methyl ethyl ketone. It is also possible for the dispersion media to be present as mixtures and comprise surface-active agents such as surfactants. Examples of such surfactants are, inter alia, polyethylene glycols, Mersolates, carboxylates, long-chain ammonium compounds such as CTAB.

Another possible way of achieving intimate mixing is the direct synthesis of a mixture of hydrotalcite-like and aluminum hydroxide-comprising substances by precipitation reactions. Such processes can be carried out, inter alia, as described in DE 195 03 522 A1 by hydrolysis of water-sensitive precursors, which allows many possible compositions. Other alternative processes for producing mixtures of hydrotalcite-comprising and aluminum hydroxide-comprising substances can be carried out on the basis of precipitation reactions from aqueous media. For example, it is possible to use carbonate-comprising precipitates or carbon dioxide-comprising gas mixtures can be allowed to act under pressure on suitable precursor solutions of metal salts or metal hydroxides.

Examples of hydrotalcite-comprising starting materials used for the purposes of the invention are products from Sasol which are marketed under the trade name Pural MG (Pura) MG5 to Pural MG70 are commercially available, where Pural MG70 is an Mg—Al hydrotalcite without addition of aluminum hydroxide). Intimate mixing of magnesium- and aluminum-comprising hydrotalcites with other carbonates, hydroxides or hydroxyl carbonates is also encompassed by the invention.

Preference is given to using hydrotalcites or hydrotalcite-like compounds having a particularly high purity for the process of the invention. The process for producing these hydrotalcite-like compounds which are particularly preferably used in the process of the invention is disclosed by J. P. van Berge et al. in DE 195 03 522 A1.

According to DE 195 03 522 A1, the hydrotalcites or hydrotalcite-like compounds are formed by hydrolysis of metal alkoxides by means of water and subsequent drying of the hydrolysis products obtained as precipitate. The metal alkoxides are formed by reaction of monovalent, divalent and/or trivalent alcohols with one or more divalent metals and/or one or more trivalent metals. The water used for the hydrolysis preferably comprises water-soluble anions selected from the group consisting of hydroxide anions, organic anions, in particular alkoxides, alkyl ether sulfates, aryl ether sulfates and glycol ether sulfates and inorganic anions, in particular carbonate, hydrogencarbonate, chloride, nitrate, sulfate and/or polyoxymetalate anions. Ammonium is preferably used as counterion.

As hydrotalcite-comprising materials which are particularly suitable as starting materials for producing the catalyst and have been prepared by hydrolysis of metal alkoxides, mention may be made of materials which can be procured from Sasol under the trade names Pural MG5, Pural MG20, Pural MG30, Pural MG50 and Pural MG70. According to the information provided by the manufacturer, the numerical value in the product names is the percentage by weight of MgO present in the product. To obtain a total weight of 100%, the proportion by weight of $Al_2O_3$ has to be added to the proportion by weight of MgO. It should be noted that the figures here are based on the oxides, although the samples also comprise hydroxide groups and water. It is also possible to procure materials which have other MgO to $Al_2O_3$ ratios. Particularly in those products or materials which have low magnesium contents, it is possible for these to comprise not only magnesium-aluminum-comprising hydrotalcite but also proportions of finely divided aluminum hydroxide or oxide hydrate.

A particularly preferred hydrotalcite-comprising starting material, viz. Pural MG30, comprises, for example, a mixture of hydrotalcite (i.e. a component having the composition $Mg_6Al_2(OH)_{18}*4H_2O$ or $Mg_6Al_2(OH)_{16}CO_3*4H_2O$) and boehmite, with the mixture having an overall $Al_2O_3$/MgO ratio close to seventy to thirty % by weight. This number in the trade name of the product used here relates to the calcite material and means that in this particularly preferred example, the starting material has a boehmite content of about 55% by weight.

Instead of hydrotalcite, which is particularly preferred as constituent of the starting material in the production process of the invention, it is also possible to use other metal hydroxides or hydroxycarbonates as starting materials. Particular preference is given to those which can be produced by the same synthesis process as hydrotalcites and hydrotalcite-like compounds.

It is also important for the purposes of the invention for the hydrotalcite-comprising starting material to have a preferred Al/Mg ratio. In a description of the composition of the hydrotalcite-comprising starting material in terms of the oxides comprised therein (in ignited form), the preferred alumina/magnesia ratio (i.e. the $Al_2O_3$/MgO ratio) is in the range from 0.5 to 20 on a weight basis, with an alumina/magnesia ratio of from 1 to 10 on a weight basis being more preferred.

The preferred Al/Mg ratio is in the range from 1.5 to 2.5 on a molar basis, with an Al/Mg ratio of from 1.7 to 2.3 on a molar basis being more preferred. The preferred hydrotalcite-comprising starting material should preferably be able to be converted in significant proportions or virtually completely into a material having spinel or spinel-related structures or phase mixtures of such structures by high-temperature calcination at temperatures above 500° C.

Another important aspect of the invention is very intimate mixing of the hydrotalcite-comprising starting material with the fusible metal salt which gives close contact between the nickel species and the support precursor component and leads to unexpectedly good stabilization of the nickel species. After calcination, this leads, as mentioned above, to a mixed oxide phase having the composition $Ni_xMg_{(1-x)}O$ where x=0.3-0.7, preferably 0.4-0.6. (The molar range of x=0.3-0.7 corresponds to an NiO content of about 44-81% by weight and in the case of x=0.4-0.6 the NiO content is about 55-73.5% by weight.) Furthermore, a certain proportion of Ni spinel could be detected by means of XRD analyses after calcination.

The XRD results indicate that depletion of Mg species occurs in the mixed oxide phase $Ni_xMg_{(1-x)}O$. The Mg species replace Ni species in the Ni spinel. A possible explanation, which does not constitute a restriction of the invention, would be that a proportion of the aluminum continues to be present as aluminum oxide hydrate even at high temperatures. Under reductive conditions at high temperatures, elimination of metallic nickel from the mixed oxide phase $Ni_xMg_{(1-x)}O$ could occur, with the magnesium liberated then reacting with the aluminum oxide hydrate to form magnesium-aluminum spinel.

As regards the molar ratio of metal species in the hydrotalcite-comprising starting material $M_{HT}$ and metal species in the salt melt $M_S$, it can be stated that the molar ratio of metals $M_{HT}/M_S$ is always greater than 1. The molar ratio $M_{HT}/M_S$ is preferably in the range from 15 to 1.5 and more preferably in the range from 10 to 3. The use of a preferred ratio is important to ensure the conditions for good mixing of the components and homogeneous coating of the hydrotalcite and thus ensure the nanostructuring, in particular the high dispersion and finely divided nature of the nickel and the finely divided nature of the Mg spinel, of the material according to the invention.

In a preferred embodiment, the pulverulent hydrotalcite-comprising material is heated before contacting with the fusible metal salt and on being brought into contact with the metal salt has a temperature in the range from 30 to 250° C., preferably in the range from 50° C. to 140° C.

The temperature required for melting the metal salt depends on the properties of the metal salt or metal salt mixture used in each case. Metal salts which are particularly suitable for the process of the invention have a melting point in the range from 30 to 250° C.

In one of the preferred embodiments of the process of the invention, the hydrotalcite-comprising starting material is brought into contact with the metal salt melt. To suppress solidification of the metal salt melt during contacting and mixing with the hydrotalcite, it is advantageous to preheat the metal salts to a temperature which is at least 10° C. above, preferably 20° C. above, the temperature of the melting point of the salts or salt mixture used in each case.

In selecting the process parameters for contacting of the powder with the melt, it has to be taken into account that the water of crystallization of the hydrotalcite and of the metal salt melt is subjected to evaporation. This evaporation depends on the temperature, the gas exchange, the gas atmosphere and the duration of the process. Complete evaporation of the water of crystallization can be undesirable since decomposition of the salt or of the hydrotalcite can then occur before homogenization of the mixture. Solidification of a region in the melt which has not yet been intimately mixed with the hydrotalcite-comprising material adversely affects the homogeneity of the distribution of the metal species on the solid hydrotalcite-comprising starting material.

The duration of contacting should be very short, i.e. preferably less than or equal to 30 minutes. The gas atmosphere should preferably comprise a certain proportion of water in order to suppress the decomposition of metal salt or the hydrotalcite-comprising starting material during mixing. The content of water vapor here can be, for example, in the range from 0 to 10% by volume.

It is advantageous to heat the hydrotalcite comprising starting material to a temperature which corresponds approximately to the temperature of the salt melt before being brought into contact with the salt melt in order to avoid uncontrolled solidification of the salt melt.

I. Contacting and Mixing of Hydrotalcite with Metal Salt

It firstly has to be pointed out that the process step of contacting of the hydrotalcite-comprising starting material with the metal salt is not subject to any limitation. However, a number of embodiments of contacting which are advantageous are indicated below.

For example, the hydrotalcite-comprising starting material can firstly be combined and mixed with the pulverulent metal salt at a temperature below the melting point of the salt before the latter is melted. The substances are firstly combined cold. The combining and mixing can be carried out in a plurality of steps or in a single step.

In another preferred embodiment of the process of the invention, the pulverulent hydrotalcite-comprising starting material is placed in a vessel and the metal salt melt is added thereto while agitating the solid. The melt can be added to the hydrotalcite a little at a time in a plurality of steps or in a single step.

In still another embodiment, which is likewise preferred, the hydrotalcite-comprising starting material is first coated with the metal salt before the latter is then melted. Here, it is possible, for example, firstly to suspend the hydrotalcite-comprising starting material in water and combine it with a metal salt solution. The mixture of the hydrotalcite-comprising starting material and the metal salt solution forms a suspension which can, for example, be dried by spray drying.

To ensure intimate mixing of the fusible metal salt and the hydrotalcite-comprising starting material, the components which have been brought into contact with one another have to be mixed and homogenized by means of mechanical mixing elements. As mixers, it is possible to use, for example, power mixers, tumblers, kneaders, etc. The suitable industrial means for mixing should be known to a person skilled in the art. The duration of the mixing step is preferably ≥2 minutes, more preferably ≥10 minutes and even more preferably ≥30 minutes.

The mixing as per step (ii) and the thermal treatment as per step (iii) are preferably carried out simultaneously. The material to be mixed is preferably heated during the mixing process in order to prevent solidification or crystallization of the salt melt.

II. Further Process Steps for Producing the Catalyst (a) The homogenized mixture of metal salt and hydrotalcite is subjected to a low-temperature calcination. The low-temperature calcination is carried out by thermal treatment of the homogenized mixture in a temperature range from 100° C. to 500° C. for a time in the range from 0.1 h to 24 h. The material is preferably heated using a controlled heating rate. The heating rate is preferably less than 20° C./min, preferably less than 10° C./min and more preferably less than 5° C./min.

The material obtained after the low-temperature calcination can be present as a finely divided powder or as coarsely particulate loose material. To be able to use the material as loose particulate catalyst, a shaping process can be necessary. As shaping step, it is possible to carry out, for example, comminution or milling. The further processing of a very coarsely particulate loose material could possibly lead to an adverse effect on the material in the subsequent high-temperature calcination.

(b) The material which has been calcined at low temperature is preferably subjected to a shaping process in order to obtain a molded material. This shaping process can comprise one or more of the following steps:

b.i) compacting, b.ii) comminution, b.iii) sieving and/or b') tableting.

In a further process variant, the shaping process is an extrusion process. The melt-impregnated catalyst composition is, for example, processed by means of an extruder with additional additives to give the desired shaped bodies. When a shaping process by means of extrusion is used, it is conceivable that the process step of low-temperature calcination (iv) does not have to be carried out. The process can be carried out with the calcination occurring only after extrusion in the form of a high-temperature calcination step. In general, a low-temperature calcination is carried out before extrusion.

(c) The molded material always has to be subjected to a high-temperature calcination process. The target temperature in the high-temperature calcination is in the region of greater than or equal to 500° C., preferably in the range from 500 to 1000° C., more preferably in the range from 700 to 1000° C. The duration of the high-temperature calcination, i.e. the heating of the sample at the target temperature, is in the range from 0.1 to 24 h.

(d) The high-temperature calcination can be carried out in the presence of an oxygen-comprising atmosphere, preferably air. The heating of the sample to the target temperature is preferably carried out using a controlled heating rate, preferably a heating rate of less than 20°/min and more preferably less than 10° C./min.

In the production of the catalyst of the invention, it can be preferred for at least individual steps of the production process to be carried out continuously. For example, particular preference is given to carrying out the low-temperature calcination in a continuously operated rotary tube furnace.

In one embodiment which is particularly preferred, the invention provides a catalyst and a process for the catalysis of heterogeneous reactions, preferably the reaction of methane, carbon dioxide and water to give synthesis gas, which comprises at least the three phases nickel-magnesium mixed oxide, magnesium spinel and aluminum oxide hydroxide and in which the nickel-magnesium mixed oxide has an average crystallite size of ≥100 nm, preferably ≥70 nm, more preferably ≤40 nm, and the magnesium spinel phase has an average crystallite size of ≤100 nm, preferably ≤70 nm, more preferably ≤40 nm, the proportion of nickel is in the range 7-28 mol %, that of magnesium is in the range 8-26 mol %, that of aluminum is in the range 50-70 mol % and the BET surface area is in the range 10-200 $m^2/g$.

Particular preference is also given to an embodiment of the catalyst of the invention which has a proportion of nickel in the range 6-30 mol % and a proportion of magnesium in the range 8-38 mol %, preferably in the range from 23-35 mol %. The proportion of aluminum is preferably in the range 50-70 mol %.

It should be emphasized that particularly high-performance catalysts and thus particularly preferred embodiments of the invention are obtained when the physicochemical properties of the catalysts have particular values.

In a preferred embodiment, the physicochemical properties of the catalyst of the invention selected from the group consisting of phase composition according to XRD, BET surface area, pore structure, average pore diameter and/or tamped density have preferred values.

The phase composition of a particularly preferred catalyst is distinguished by the intensity of the diffraction reflection at 43.15°±0.15°2θ (2 theta) (d=2.09±0.01 Å) being less than or equal to the intensity of the diffraction reflection at 44.83°±0.20°2θ (d=2.02±0.01 Å), with the intensity of the diffraction reflection at 43.15°±0.15°2θ (2 theta) (d=2.09±0.01 Å) more preferably being less than the intensity of the reflection at 44.83°±0.20°2θ (d=2.02±0.01 Å) and the intensity ratio of the two diffraction reflections $I_{(43.15°)}/I_{(44.83°)}$ even more preferably being from 0.3 bis 1.0, preferably from 0.5 to 0.99, more preferably from 0.6 to 0.97 and particularly preferably 0.7 to 0.92. A diffraction pattern (5-80°2θ) of a catalyst according to the invention having a molar ratio of Ni/Mg/Al of 14/29/57 is depicted by way of example in FIG. 2.

A particularly preferred embodiment of the catalyst has a BET surface area in the range from 10 to 200 $m^2/g$, preferably from 15 to 150 $m^2/g$, more preferably from 20 to 100 $m^2/g$, even more preferably from 30 to 80 $m^2/g$, very particularly preferably from 30 to 78 $m^2/g$ and in particular from 30 to 76 $m^2/g$. The determination of the specific surface area by the BET method was carried out in accordance with DIN 66131.

Furthermore, preference is given to the catalyst of the invention having an at least bimodal pore structure, preferably a trimodal pore structure. The characterization of the pore structure of the catalyst (crushed material fraction 0.5-1.0 mm) is effected by means of mercury porosimetry carried out in accordance with DIN 66133. Here, the at least bimodal pore structure comprises mesopores (having a pore diameter in the range 4-40 nm) and macropores (having a pore diameter in the range 30-120 nm). In addition, the catalyst can, in a further preferred embodiment, also have macropores whose pore diameter is, for instance, in the range from 100 to 2000 nm. In a preferred embodiment of the catalyst, the average pore diameter (average pore size) is greater than 15 nm, more preferably greater than 18 nm and in particular greater than 20 nm.

In addition, a preferred embodiment of the catalyst also has a characteristic tamped density which is preferably <1500 g/l, more preferably <1350 g/l and even more preferably ≤1100 g/l. The determination of the characteristic tamped density was carried out by means of a tamping volumeter STAV 2003 from JEL. A 0.5-1.0 mm crushed material fraction of the catalyst was used for the measurement.

In a further process step, the calcined catalyst is exposed to a reductive gas atmosphere while being heated in order to reduce at least part of the metal species, preferably of the nickel. This thermal treatment under a reductive gas atmosphere is preferably carried out in the same reactor in which the catalytic process is carried out.

It has also been found, inter alia, that the catalysts of the invention can also be used without a reductive pretreatment for the process of the invention for producing synthesis gas. This result is noteworthy in that a treatment step using hydrogen can be saved in the start-up of the process, as a result of which the process economics can be improved. It may be assumed that the main part of the nickel or of the active metals is present in the oxidic form.

III. Process for the Reforming of Methane in the Presence of $CO_2$

In general, the methane reforming is carried out in a continuous process in which the catalyst has been introduced into a tube reactor. In this context, it is advantageous for the reduction step to be carried out in the same tube reactor in which the catalyst is used for carrying out the reforming.

The reforming is carried out at a temperature in the range from 500° C. to 1100° C. and pressures of from 2 to 70 bar. The pressures when carrying out the process are preferably in the range from 5 to 70 bar, more preferably in the range from 10 to 40 bar and even more preferably in the range from 20 to 40 bar. In an advantageous embodiment of the reforming process, the catalyst is subjected to conditioning. The conditioning is a defined start-up procedure by means of which the catalyst is preactivated. The catalyst material forms a nanostructure by means of which sintering of the active metal and deposition of carbonaceous material on the catalyst can be suppressed or ruled out.

An important aspect of the invention also concerns a high-pressure process (p≥20 bar) for reaction of a feed gas which has a very high $CO_2$ content and simultaneously has a small proportion of water vapor. It should also be emphasized here that it is surprising and unexpected that such a mode of operation is possible and does not lead to carbonaceous deposits on the catalyst. The small amounts of water vapor enable the process economics to be improved very substantially, which is particularly unexpected for the nickel-comprising catalysts. In addition, the result is a product stream which has an advantageous stoichiometric composition in respect of the molar ratio of hydrogen to CO of $H_2/CO \leq 2.0$, which is otherwise achieved only by means of autothermal reforming and partial oxidation.

During conditioning, the catalyst of the invention is firstly exposed to a methane-comprising gas stream which has a high proportion of water vapor and/or hydrogen. Here, the catalyst is heated to a temperature of 700° C.

In a subsequent step, $CO_2$ is added to the feed gas stream and hydrogen is subsequently added, with the introduction of water vapor at the same time being firstly reduced and subsequently stopped.

The feed fluid stream comprises the compounds which are necessary for the desired process, namely $CH_4$, $CO_2$ and $H_2$ and also $H_2O$.

The temperature of the catalyst can be increased from the conditioning temperature to the process temperature. The process temperature is preferably in the range from 700° C. to 1100° C. An upper limit to the process temperature is imposed by the heat resistance of the steel reactors used for the process. The upper limit to the process temperature is preferably in the range from 950° C. to 980° C.

An advantageous composition of the feed fluid for the preactivation comprises from 30% to 45% of each of methane and $CO_2$ and also from 5 to 40% of $H_2$ and 5-15% of $H_2O$. [In addition, the feed fluid can also comprise further components, for example argon gas which functions as internal standard.]

In a particularly advantageous embodiment of the process of the invention, the composition of the feed fluid for preactivation of the catalyst comprises from 25% to 50% of each of methane and/or $CO_2$ and from 5 to 50% of $H_2O$ and/or 5-40% of $H_2$. [In addition, the feed fluid can also have further components, for example argon which functions as internal standard.]

The catalyst of the invention has a high efficiency for the reaction of $CH_4$ and $CO_2$. A product stream which has an advantageous stoichiometric composition in respect of the molar ratio of hydrogen to CO is obtained. An $H_2/CO$ ratio of less than 2, particularly preferably less than 1.5, in particular less than 1.2, is considered to be advantageous.

In a preferred mode of operation of the reforming process of the invention, the molar $CO_2/CH_4$ ratio is in the range from 0 to 1.5, preferably in the range from 0.3 to 1.4, more preferably from 0.5 to 1.3 and more preferably from 0.7 to 1.2.

In addition, preference is also given to a mode of operation of the reforming process of the invention in which the molar $H_2O/CH_4$ radio is ≤2.0, more preferably ≤1.5, even more preferably ≤1.0, in particular ≤0.9. In principle, carrying out the process of the invention in a mode of operation in which the amount of water vapor is reduced further or the addition of water vapor can be omitted entirely is not completely ruled out.

An advantage which may also be mentioned in respect of the process of the invention is that the catalyst which is produced by the process of the invention has a longer operating life than the catalysts known from the prior art. The longer operating life makes it possible to reduce the catalyst replacement cycles of the reforming process and improve the economics.

Another advantage which may be mentioned in respect of the process of the invention is that the catalyst which is produced by the process of the invention can be operated at substantially greater reactor pressures than the reforming catalysts known from the prior art.

The process of the invention makes it possible to produce a synthesis gas which itself has a high pressure. The process is thus suitable for producing a synthesis gas which has a high pressure and is used in a downstream high-pressure process. Compared to the processes of the prior art, the use of a compression stage can be dispensed with here.

The process of the invention for producing synthesis gas is operated at a GHSV in a range from 500 to 50 000 $h^{-1}$, preferably in a range from 1000 to 15 000 $h^{-1}$ and in particular in a range from 1000 to 5000 $h^{-1}$.

In a further aspect of the invention, it is also possible to achieve, by means of the process of the invention using the catalyst of the invention, an operating state in which the catalytic high-pressure process can be operated in respect of the methane conversion close to the thermodynamic equilibrium, with the methane conversion preferably being at least 50% of the methane conversion at thermodynamic equilibrium, more preferably at least 85% of the methane conversion at thermodynamic equilibrium and in particular 90% of the methane conversion at thermodynamic equilibrium.

EXAMPLES

Production Process

The process of the invention for producing the catalyst is illustrated below with the aid of example E1. 261.7 g of pulverulent nickel nitrate hexahydrate ($Ni(NO_3)_2 * 6H_2O$ from Merck) were placed in a glass beaker and melted at a temperature of about 100° C. by heating on a hotplate. 400 g of preheated hydrotalcite powder were subsequently introduced into the glass beaker in which the nitrate salt melt was present, with the nitrate salt melt being mixed by means of a mechanical stirrer on a hotplate during introduction of the hydrotalcite. The drive of the stirrer was arranged above the opening of the glass beaker. Pural MG30 from Sasol was used as hydrotalcite. Before introduction of the hydrotalcite, the latter had been heated for 30 minutes at 130° C. in a convection oven. The introduction of the hydrotalcite into the melt was carried out in a plurality of substeps and over a total period of 10 minutes. The glass beaker with the mixture of hydrotalcite and salt melt was heated at 130° C. in the oven for 30 minutes and subsequently mixed for about 5 minutes by means of a stirrer and for a further 2 minutes by means of an Ultra-Turrax stirrer.

The mixture of nitrate salt and hydrotalcite obtained here was cooled and divided into two parts of about 330 g which were then subjected to a low-temperature calcination in a rotary bulb furnace. For this purpose, the samples were introduced into a fused silica flask which was fastened in the rotary bulb furnace and was rotated at a speed of 12 revolutions per minute while passing an air stream of 1 l/min through it. The fused silica flask in which the sample mixture was present was heated stepwise via three different temperature stages of 120° C., 180° C. and 280° C. to a target temperature of 425° C. The residence time of the sample at the individual temperature stages of the heating phase and at the target temperature was in each case 2 hours. 2° C./minutes was used as heating rate.

The product obtained from the low-temperature calcination was mixed with (5% by weight of) lubricant and pressed to form pellets by means of a mechanical punch press (XP1 from Korsch) using a pressing force in the range from 30 to 35 kN.

As lubricant, it is possible to use, for example, graphite, stearic acid or magnesium stearate. The pellets obtained here had a diameter of 13 mm and a thickness of about 4-5 mm. The pellets were precomminuted by means of a rotary screen mill at a speed of rotation of 70 rpm and pressed through a sieve. The precomminuted material was subsequently sieved in order to separate off the target fraction having a particle size of from 500 to 1000 μm. Sieving was carried out by means of a sieving machine from Retsch (Model AS 200) using a shaking frequency of 60 Hz.

The material obtained after sieving was subjected to a high-temperature calcination at 950° C. For this purpose, the sample material was heated in a muffle furnace to 950° C. at a heating rate of 5° C./minute while passing an air stream (of 6 l/min) through the furnace, heat treated at 950° C. for 4 hours and then cooled to room temperature.

In examples E2 and E3, the catalysts were produced in the same way as in example E1, with Pural MG5 being used as hydrotalcite-comprising starting material in the case of example E2 and Pural MG20 being used in the case of example 3. The stoichiometric compositions of the catalysts were, for example E1: $Ni_{14}Mg_{29}Al_{57}$, for example E2: $Ni_{24.0}Mg_{9.4}Al_{66.7}$ and for example E3: $Ni_{8.1}Mg_{25.2}Al_{66.7}$. The BET surface areas of the catalysts were, for example E2: 47 m$^2$/g and for example E3: 77 m$^2$/g.

Comparative Example 1

As comparative example 1, a precipitated catalyst was produced. For this purpose, 0.9 l of deionized water were firstly introduced into a glass reactor equipped with a stirring device and pH electrode and heated to 70° C. 2.94 l of metal salt solution at a constant metering rate of 33 ml/min and 2 molar sodium carbonate solution were subsequently fed into the glass reactor. (The metal salt solution had previously been produced by combining solutions of nickel nitrate, magnesium nitrate and aluminum nitrate. The respective starting solutions had a concentration of 1 mol per liter and 0.394 l of nickel solution, 0.861 l of magnesium solution and 1.684 l of aluminum solution were used. This corresponds to a molar ratio of Ni:Mg:Al of 13.4:29.3:57.3.)

Simultaneously with the introduction of the metal salt solution and the carbonate solution into the glass reactor, the mixture comprised in the glass reactor was mixed by means of the stirrer. The amount of carbonate solution added was monitored by means of the pH, with a feed rate at which the pH could be kept in the region of 8.5 being selected. After the precipitation was complete and the metal salt solution has been transferred completely into the glass reactor, the mixture was stirred for another 60 minutes in order to age the precipitation product. During aging, the mixture present in the glass reactor was heated to 70° C. and air was at the same time blown into the reactor.

After aging was complete, the precipitate was filtered off on a black band filter on a porcelain suction filter and washed by means of deionized water. While carrying out the washing process, the nitrate contents of the washings was monitored and washing was stopped when a nitrate content below 10 ppm had been reached. The washed filter cake was slurried in 5 l of water, dispersed by means of an Ultra-Turrax and subsequently spray dried. Spray drying was carried out using a Mobile Minor spray dryer from Niro by means of a two-fluid nozzle, with the temperature used at the top of the dryer being 350° C. and the exhaust gas temperature being 115° C. The suspension fed to spray drying had a solids content of about 5% by weight.

The spray-dried powder was introduced into a fused silica flask and subsequently precalcined in a rotary bulb furnace. During the precalcination, the fused silica flask was rotated at a speed of 12 rpm. An air stream was passed at a flow rate of 1 l/min through the interior of the fused silica flask.

Starting from room temperature, the fused silica flask together with the sample comprised therein was heated at a heating rate of 2° C./min to 425° C. and heated at this temperature for 2 hours, with the heating-up process being interrupted at 120° C., 180° C. and 280° C. for a time of 2 h in each case.

For shaping, the precalcined sample powder was treated in the absence of lubricants by means of a roller compactor of the type RC100×30. Compaction was carried out in five cycles using a pressing pressure of 250 bar, with the compactor being equipped with fluted rollers. In the last of the five compacting cycles, a screen insert having a mesh opening of 1.6 mm was used underneath the rotary screen mill for preclassification. The sample obtained from preclassification was pressed through a sieve having a mesh opening of 1 mm and the 0.5-1 mm particle fraction was subsequently separated off as target fraction by means of a sieving machine. The separation was carried out by sieving for a period of 20 minutes using a frequency of 70 Hz.

Catalyst Testing

To determine the efficiency of the individual catalysts in reforming, these (i.e. the catalyst from example 1 to example 3 and comparative example CE1) were used in a laboratory catalysis apparatus under the process conditions for reforming reactions which are also of importance in industrial processes. The tubular reactors used for testing had a capacity of about 30 ml. The amount of catalyst used for the individual tests was 20 g (or 20 ml in the isothermal zone).

The results achieved in the catalysis experiments are shown in Tables 2 to 5 for examples E1 to E3 and in Table 6 for comparative example CE1.

The catalysts introduced into the reactors in examples 1 to 3 and comparative example CE1 were firstly subjected to activation. To carry out activation, the catalyst was heated for a period of 10 hours at 450° C. in a hydrogen-comprising atmosphere (5% by volume of $H_2$ in $N_2$) in order to convert the nickel oxide at least partly into metallic nickel. The heating of the catalyst was carried out by means of a temperature program, with intermediate stages being inserted at 250° C. and 350° C. To reach the first intermediate stage, a heating rate of 10° C./min was selected. The second intermediate stage and the target temperature were approached at a heating rate of 1° C./min. The residence time at the intermediate stages was 25 minutes. Further process conditions were a GHSV of 3810 h$^{-1}$, a feed gas introduction rate of 1.27 standard l/min and a process pressure of 20 bar.

The stem reforming reactions are carried out at temperatures of greater than or equal to 850° C.

A particular test procedure in which the feed gas comprises, in each case, 47.5% of $H_2O$ and 47.5% of $CH_4$ was established. 5% of Ar as internal standard was mixed into the feed gas. At the beginning of the experiment, the catalyst was exposed to an atmosphere comprising only water vapor, nitrogen and argon but no methane in order to avoid the formation and deposition of carbonaceous material of the catalyst. The methane content of the feed gas was increased stepwise from 0% by volume to 47.5% by volume while reducing the nitrogen content. The initial phase of the experiment can be divided into five process steps having different feed gas compositions (see Table 1).

After conclusion of the initial phase (i.e. phase 1 in Table 1), the $CH_4$ concentration (of 47.5% by volume) is the same as the $H_2O$ concentration (of 47.5% by volume). In the next process step, part of the $CH_4$ and of the $H_2O$ is replaced by $CO_2$ (the corresponding ratios are indicated in Table 2).

Subsequently, $H_2O$ is replaced completely by $H_2$ (phase 3 in Table 2).

The stepwise lowering of the $H_2$ concentration and an increase in the reactor temperature from 850° C. to 950° C. gradually increases the severity of the process conditions.

When setting the last process step, $H_2$ is replaced completely by $H_2O$ (the transition from phase 8 to phase 9 in Table 2).

The important parameters for assessment of the quality of a catalyst are the conversions of $CO_2$ and of $CH_4$ achieved by means of the catalyst and also the molar ratio of $H_2$/CO [mol %/mol %] in the product gas.

An $H_2$/CO ratio of about 1 achieved during phase 6 is of great industrial and economic importance. The concentration of $CH_4$ and $CO_2$ in the feed gas were in each case 37.5% by volume and the concentration of $H_2$ in the feed gas was 20% by volume. The catalyst of example 2 displayed an extraordinary ability to activate methane under these process conditions, which can be seen from the high $CH_4$ conversions in Table 2. Furthermore, the catalyst has a high hydrogenation capability in respect of $CO_2$.

The catalysts of example 1, example 2 and example 3 could be operated for a period of more than 100 hours under very severe or very rough process conditions ("high severity") (phases 7, 8 and 9).

To examine the performance of the catalysts of the invention further under industrially relevant reforming conditions, the catalyst of example 1 was subjected to further testing at a temperature of 850° C. and a process pressure of 20 bar, with the test program providing gradual reduction of the water vapor content. The results achieved in the experiment are shown in Table 5.

Catalyst E1 was firstly subjected to activation carried out in the manner described in the previous catalysis experiments. Further process conditions were a GHSV of 3810 $h^{-1}$, a feed gas feed rate of 1.27 standard l/min and a process pressure of 20 bar.

A particular test program was established in which the feed gas comprises 47.5% of $H_2O$ and 47.5% of $CH_4$. 5% of Ar, which was used as internal standard, were mixed into the feed gas. At the beginning of the experiment, the catalyst was exposed to an atmosphere comprising only water vapor, nitrogen and argon but no methane in order to avoid formation and deposition of carbonaceous deposits on the catalyst. In a manner similar to the previous catalysis experiments, the methane content of the feed gas was increased stepwise from 0% by volume to 47.5% by volume, with the nitrogen content being reduced. The initial phase of the experiment can be divided into five process steps which have different feed gas compositions (see Table 1).

After conclusion of the initial phase (i.e. phase 1 in Table 5), the $CH_4$ concentration (of 47.5% by volume) is equal to the $H_2O$ concentration (of 47.5% by volume). In the next process step, part of the $CH_4$ and of the $H_2O$ is replaced by $CO_2$ (phase 2 in Table 5).

The $H_2O$ content of the feed gas is subsequently reduced stepwise and replaced by equimolar amounts of $CH_4$ and $CO_2$ (phases 3-4 in Table 5). The lowering of the $H_2O$ concentration results in an increase in severity of the process conditions.

The important parameters for assessing the quality of the catalyst are the conversions of $CO_2$ and of $CH_4$ achieved by means of the catalyst, the molar ratio of $H_2$/CO [mol %/mol %] in the product gas and the ability of the catalyst to suppress reactions leading to carbonaceous deposits effectively and thus ensure stable operation over prolonged periods of time under high-severity process conditions.

Under these process conditions, the catalyst of example 1 displayed an extraordinary ability to ensure stable, carbonaceous deposit-free operation over a cumulated time of >800 h under high-severity conditions (Table 5).

Testing of the Catalyst from Comparative Example 1

The catalytic test data for the catalyst of comparative example CE1 are summarized in Table 6. The catalyst of comparative example CE1 was subjected to the same process conditions as the catalyst according to the invention. It can be seen that the methane conversion achieved at a temperature of 850° C. in the absence of water when using the catalyst which is not according to the invention is much lower than the methane conversion achieved using the catalyst according to the invention. In addition, only a small $CO_2$ conversion was achieved using the catalyst which was not according to the invention. The corresponding data are shown in Table 6; only very low conversions were able to be achieved, especially while carrying out process phases 3 and 4. In the case of the catalyst of comparative example 1, the test had to be stopped after process phase 7 since the catalyst had been deactivated by deposits of carbonaceous material and reactions could no longer be carried out. Up to the occurrence of catalyst deactivation by carbonization, the catalyst of comparative example 1 could be operated for a period of 60 hours under process conditions.

Physical Characterization

The XRD analyses were carried out by means of a D8 Advance Series 2 from Bruker/AXS using a CuK-alpha source (having a wavelength of 0.154 nm at 40 kV and 40 mA) and θ-θ geometry (Bragg-Brentano geometry) in the reflection mode. The measurements were carried out over the measurement range 5-80° (2-theta) in 0.02° steps at 4.8 seconds/step. The structure analysis software TOPAS (Bruker AXS) was used to determine the average crystallite sizes of the individual phases.

The diffraction patterns shown in FIG. 1 display reflections characteristic of spinel phases at 31.24° 2θ, 36.84° 2θ and 44.82° 2θ for (a) and 44.44 and 44.64° 2θ for (b).

FIG. 2 shows a diffraction pattern of a catalyst which is illustrative of the invention. The diffraction pattern was recorded in the angle range from 5° to 80°2θ.

In the diffraction pattern (a), there is a reflection at 43.08° 2θ which can be assigned to the mixed oxide phase of Ni and Mg. During the catalytic process and as a result of the reductive treatment of the material, the amount of mixed oxide is decreased and metallic nickel is formed, which can be seen from diffraction pattern (b) in that there is now a reflection at 51.74° 2θ. However, the reflection at 43.12° 2θ has virtually disappeared in the diffraction pattern.

Table 1 shows the five different feed compositions (or different feed fluid compositions) to which each individual catalyst sample was exposed at the beginning of an experiment, i.e. in the intial phase after the activation process.

| Process step | $CH_4$ [% by volume] | $H_2O$ [% by volume] | $N_2$ [% by volume] |
| --- | --- | --- | --- |
| 0 | 0 | 47.5 | 47.5 |
| 1 | 10 | 47.5 | 37.5 |
| 2 | 20 | 47.5 | 27.5 |
| 3 | 30 | 47.5 | 17.5 |
| 4 | 40 | 47.5 | 7.5 |
| 5 | 47.5 | 47.5 | 0 |

Table 2 shows a summary of the catalytic data measured for the sample from example E1 during a steam reforming experiment.

| Phase | Temperature [° C.] | CH$_4$ [% by volume] | CO$_2$ [% by volume] | H$_2$O [% by volume] | H$_2$ [% by volume] | CH$_4$ Conv. [%] | CO$_2$ Conv. [%] | H$_2$/CO ratio |
|---|---|---|---|---|---|---|---|---|
| 1 | 850 | 47.5 | 0 | 47.5 | 0 | 45 | 0 | 4.0 |
| 2 | 850 | 27.5 | 27.5 | 40 | 0 | 65 | 33 | 1.6 |
| 3 | 850 | 27.5 | 27.5 | 0 | 40 | 46 | 78 | 1.5 |
| 4 | 850 | 32.5 | 32.5 | 0 | 30 | 49 | 76 | 1.2 |
| 5 | 950 | 32.5 | 32.5 | 0 | 30 | 66 | 78 | 1.1 |
| 6 | 950 | 37.5 | 37.5 | 0 | 20 | 64 | 73 | 1.0 |
| 7 | 950 | 42.5 | 42.5 | 0 | 10 | 57 | 67 | 0.8 |
| 8 | 950 | 42.5 | 42.5 | 5 | 5 | 67 | 67 | 0.8 |
| 9 | 950 | 42.5 | 42.5 | 10 | 0 | 82 | 74 | 0.9 |

Table 3 shows a summary of the catalytic data measured for the sample from example 2 during a steam reforming experiment.

| Phase | Temperature [° C.] | CH$_4$ [% by volume] | CO$_2$ [% by volume] | H$_2$O [% by volume] | H$_2$ [% by volume] | CH$_4$ Conv. [%] | CO$_2$ Conv. [%] | H$_2$/CO ratio |
|---|---|---|---|---|---|---|---|---|
| 1 | 850 | 47.5 | 0 | 47.5 | 0 | 40 | 0 | 4.3 |
| 2 | 850 | 27.5 | 27.5 | 40 | 0 | 45 | 22 | 1.7 |
| 3 | 850 | 27.5 | 27.5 | 0 | 40 | 11 | 54 | 2.0 |
| 4 | 850 | 27.5 | 27.5 | 0 | 30 | 6 | 35 | 2.2 |
| 5 | 950 | 32.5 | 32.5 | 0 | 30 | 50 | 73 | 1.2 |
| 6 | 950 | 37.5 | 37.5 | 0 | 20 | 53 | 77 | 1.0 |
| 7 | 950 | 42.5 | 42.5 | 0 | 10 | 41 | 67 | 0.8 |
| 8 | 950 | 42.5 | 42.5 | 5 | 5 | 45 | 64 | 0.8 |
| 9 | 950 | 42.5 | 42.5 | 10 | 0 | 46 | 56 | 0.8 |

Table 4 shows a summary of the catalytic data measured for the sample 3 during a steam reforming experiment.

| Phase | Temperature [° C.] | CH$_4$ [% by volume] | CO$_2$ [% by volume] | H$_2$O [% by volume] | H$_2$ [% by volume] | CH$_4$ Conv. [%] | CO$_2$ Conv. [%] | H$_2$/CO ratio |
|---|---|---|---|---|---|---|---|---|
| 1 | 850 | 47.5 | 0 | 47.5 | 0 | 26 | 0 | 4.2 |
| 2 | 850 | 27.5 | 27.5 | 40 | 0 | 35 | 17 | 1.8 |
| 3 | 850 | 27.5 | 27.5 | 0 | 40 | 16 | 52 | 2.3 |
| 4 | 850 | 27.5 | 27.5 | 0 | 30 | 11 | 34 | 2.7 |
| 5 | 950 | 32.5 | 32.5 | 0 | 30 | 46 | 77 | 1.2 |
| 6 | 950 | 37.5 | 37.5 | 0 | 20 | 47 | 72 | 0.9 |
| 7 | 950 | 42.5 | 42.5 | 0 | 10 | 32 | 56 | 0.7 |
| 8 | 950 | 42.5 | 42.5 | 5 | 5 | 36 | 50 | 0.7 |
| 9 | 950 | 42.5 | 42.5 | 10 | 0 | 25 | 30 | 0.8 |

Table 5 shows a summary of the catalytic data measured for the sample from example E1 during the second steam reforming experiment.

Table 6 shows a summary of the measured data obtained in the catalytic tests using the catalyst from comparative example CE1. At the beginning of the test, the catalyst from

| Phase | Temperature [° C.] | CH$_4$ [% by volume] | CO$_2$ [% by volume] | H$_2$O [% by volume] | H$_2$ [% by volume] | CH$_4$ Conv. [%] | CO$_2$ Conv. [%] | H$_2$/CO ratio |
|---|---|---|---|---|---|---|---|---|
| 1 | 850 | 47.5 | 0 | 47.5 | 0 | 41 | 0 | 4.2 |
| 2 | 850 | 27.5 | 27.5 | 40 | 0 | 70 | 31 | 1.6 |
| 3 | 850 | 27.5 | 27.5 | 0 | 40 | 4 | 43 | 2.3 |
| 4 | 850 | 32.5 | 32.5 | 0 | 30 | 4 | 22 | 2.5 |
| 5 | 950 | 32.5 | 32.5 | 0 | 30 | 29 | 65 | 1.2 |
| 6 | 950 | 37.5 | 37.5 | 0 | 20 | 31 | 60 | 0.9 |
| 7 | 950 | 42.5 | 42.5 | 0 | 10 | 33 | 52 | 0.6 | comparative example CE1 was subjected to the same pretreatment as the catalyst according to the invention (see start-up procedure in Table 1 and the associated description).

| Phase | Temperature [° C.] | CH$_4$ [% by volume] | CO$_2$ [% by volume] | H$_2$O [% by volume] | H$_2$ [% by volume] | CH$_4$ Conv. [%] | CO$_2$ Conv. [%] | H$_2$/CO ratio |
|---|---|---|---|---|---|---|---|---|
| 1 | 850 | 47.5 | 0 | 47.5 | 0 | 41 | 0 | 4.2 |
| 2 | 850 | 27.5 | 27.5 | 40 | 0 | 70 | 31 | 1.6 |
| 3 | 850 | 27.5 | 27.5 | 0 | 40 | 4 | 43 | 2.3 |
| 4 | 850 | 32.5 | 32.5 | 0 | 30 | 4 | 22 | 2.5 |
| 5 | 950 | 32.5 | 32.5 | 0 | 30 | 29 | 65 | 1.2 |
| 6 | 950 | 37.5 | 37.5 | 0 | 20 | 31 | 60 | 0.9 |
| 7 | 950 | 42.5 | 42.5 | 0 | 10 | 33 | 52 | 0.6 |

Table 7 shows a summary of the physical characterization data measured on the calcined sample from example 1. The sample was treated according to the process of the invention and calcined for four hours at 950° C. The density of the sample is 0.82 g/cm$^3$.

| Physical parameter | Unit | Measured value |
|---|---|---|
| Lattice parameter of MgAl$_2$O$_4$ | [Å] | 8.083 |
| Average crystallite size of MgAl$_2$O$_4$ | [nm] | 15.0 |
| Lattice parameter of Mg$_{0.5}$Ni$_{0.5}$O | [Å] | 4.19 |
| Average crystallite size of Mg$_{0.5}$Ni$_{0.5}$O | [nm] | 18.0 |
| BET surface area (measured using N$_2$) | [m$^2$/g] | 42 |
| Hg porosimetry | [ml/g] | 0.80 |

Figure 1:
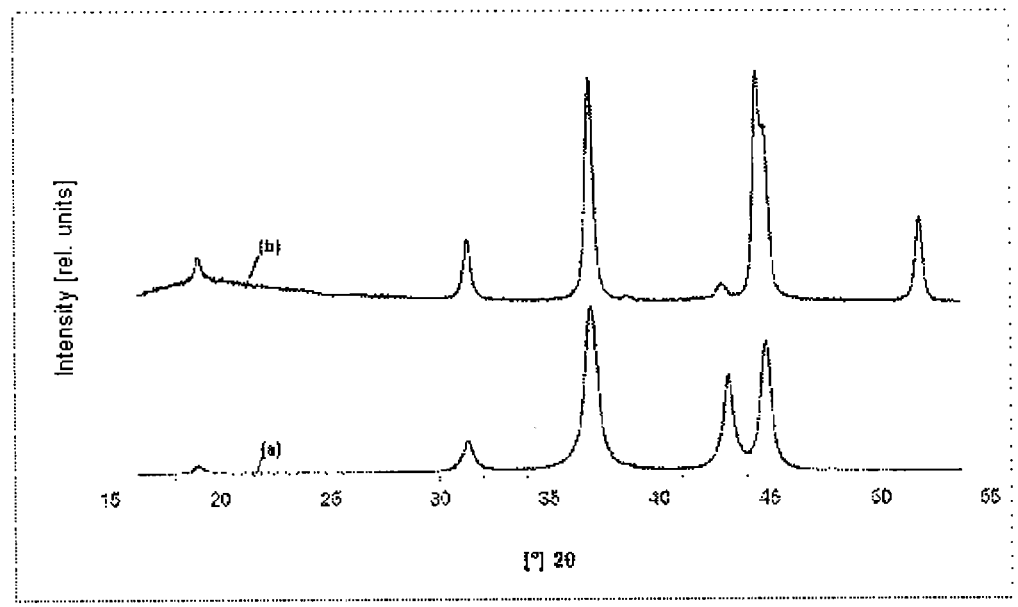
FIG. 1 shows two X-ray diffraction patterns of a material according to the invention which has an Ni/Mg/Al ratio of 0.14/0.29/0.57. The diffraction pattern (a) was recorded on the calcined material and the diffraction pattern (b) was recorded on the material after it has been used in a steam reforming process according to the invention.
Figure 2:
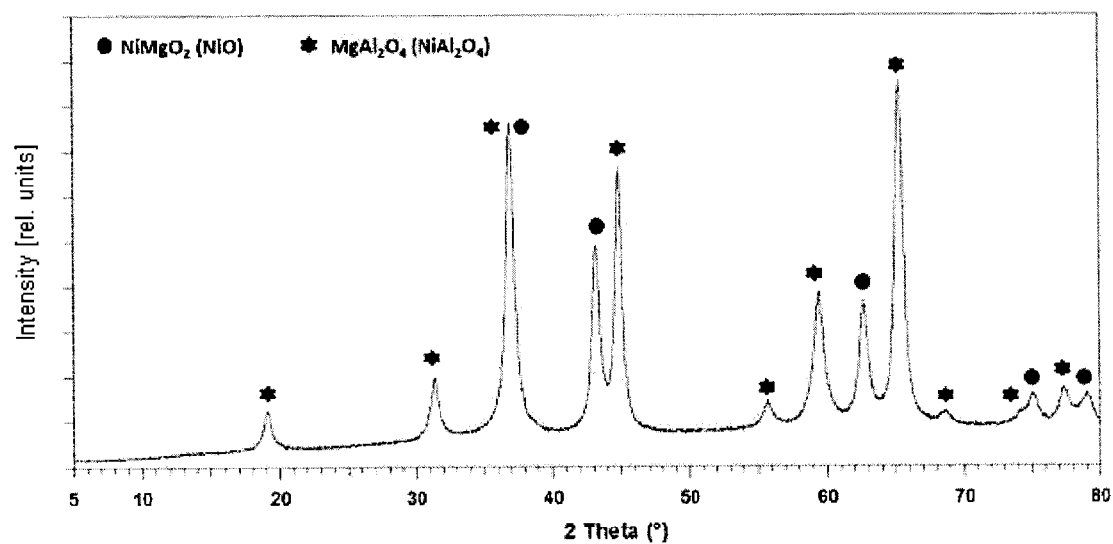
FIG. 2 shows an X-ray diffraction pattern of a catalyst according to the invention which has an Ni/Mg/Al ratio of 0.14/0.29/0.57. The diffraction pattern was recorded over an angle range from 5 to 80°.

The invention claimed is:

1. A catalyst, comprising:
   nickel-magnesium mixed oxide;
   magnesium spinel; and
   optionally aluminum oxide hydroxide,
   wherein the nickel-magnesium mixed oxide has an average crystallite size of ≤100 nm,
   the magnesium spinel has an average crystallite size of ≤100 nm,
   a proportion of nickel in the catalyst is in the range of 6-30 mol %,
   a proportion of magnesium in the catalyst is in the range of 8-38 mol %,
   a proportion of aluminum in the catalyst is in the range of 50-70 mol % and
   an intensity of the diffraction reflection of the catalyst at 43.09°2θ is less than or equal to an intensity of the diffraction reflection at 44.82°2θ.

2. The catalyst according to claim 1,
   wherein a BET surface area of the catalyst is in the range of from 10 to 200 m$^2$/g.

3. The catalyst according to claim 1,
   wherein the catalyst has a bimodal pore structure with mesopores and macropores.

4. The catalyst according to claim 3,
   wherein a diameter of the mesopores is in the range 4-40 nm and a diameter of the macropores is in the range 30-120 nm, wherein diameter is determined according to DIN 66133.

5. The catalyst according to claim 4,
   wherein the catalyst has a trimodal pore structure which additionally has macropores whose diameter is in the range from 100 to 2000 nm, wherein diameter is determined according to DIN 66133.

6. The catalyst according to claim 1,
   wherein an average pore diameter of the catalyst is >15 nm.

7. The catalyst according to claim 1,
   wherein a characteristic tamped density of the catalyst is <1500 g/l, and/or
   starting materials for producing the catalyst comprise a nickel-comprising salt and a hydrotalcite-comprising compound.

8. The catalyst according to claim 7,
   wherein the characteristic tamped density of the catalyst is <1350 g/l and/or
   the starting materials for producing the catalyst comprise nickel nitrate and hydrotalcite.

9. The catalyst according to claim 1,
   wherein a BET surface area of the catalyst is in the range of from 15 to 150 m$^2$/g.

10. A catalyst according to claim 1, obtained by a process comprising:
   (i) contacting of a fusible metal salt comprising a nickel salt and/or cobalt salt, and a finely divided hydrotalcite-comprising starting material,
   (ii) intimate mixing of the fusible metal salt and the finely divided hydrotalcite-comprising starting material, thereby forming a mixture,
   (iii) thermal treatment of the mixture and heating of the mixture under conditions under which the fusible metal salt is present in the form of a melt,
   (iv) low-temperature calcination of the mixture at a temperature of <500° C.,
   (v) molding or shaping, and
   (vi) high-temperature calcination of the mixture at a temperature of >500° C., Where an intensity of diffraction reflection at 43.08°θ is less than or equal to an intensity of diffraction reflection at 44.82°θ, and the BET surface of the catalyst is in the range of from 10 to 200 m$^2$/g.

11. A process for producing a catalyst, comprising:
   (i) contacting of a fusible metal salt and a finely divided hydrotalcite-comprising starting material,
   (ii) intimate mixing of the fusible metal salt and the finely divided hydrotalcite-comprising starting material, thereby forming a mixture,
   (iii) thermal treatment of the mixture and heating of the mixture under conditions under which the fusible metal salt is present in the form of a metal salt melt, (iv) low-temperature calcination of the mixture at a temperature of <500° C., (v) molding or shaping, and (vi) high-temperature calcination of the mixture at a temperature of >500° C to form the catalyst according to claim 1.

12. The process according to claim 11, wherein the fusible metal salt comprises a nickel salt and/or cobalt salt.

13. The process according to claim 11, wherein the intimate mixing (ii) is carried out simultaneously with the thermal treatment (iii).

14. The process according to claim 11, wherein the thermal treatment (iii) and the low-temperature calcination (iv) are carried out in one coherent process.

15. The process according to claim 11, wherein the fusible metal salt is present in the form of the metal melt when carrying out the contacting (i).

16. A process, comprising:
reforming a hydrocarbon-comprising compound and $CO_2$ with the catalyst according to claim 1 or a catalyst produced by the process according to claim 11
wherein the reforming is carried out in a temperature range of from 500° C. to 1100° C.

17. The process according to claim 16, wherein the process is carried out at a pressure in the range of from 2 to 70 bar.

18. The process claim 16, the process, comprising:
reforming a hydrocarbon compound and $CO_2$ with a feed fluid,
wherein the feed fluid has a $CH_4$ content and a $CO_2$ content which are each in the range of from 20 to 45% by volume, and water vapor in the range of from 0 to 40% by volume.

19. The process according to claim 16, wherein a molar $CO_2/CH_4$ ratio is in the range of from 0 to 1.5, and/or an $H_2O/CH_4$ ratio is <2.0.

20. The process according to claim 16, wherein a synthesis gas having an $H_2/CO$ ratio of <2 is produced.

* * * * *